March 20, 1934.          I. M. DE LA GARDE          1,951,347
FOCAL PLANE CAMERA SHUTTER
Original Filed Jan. 26, 1932
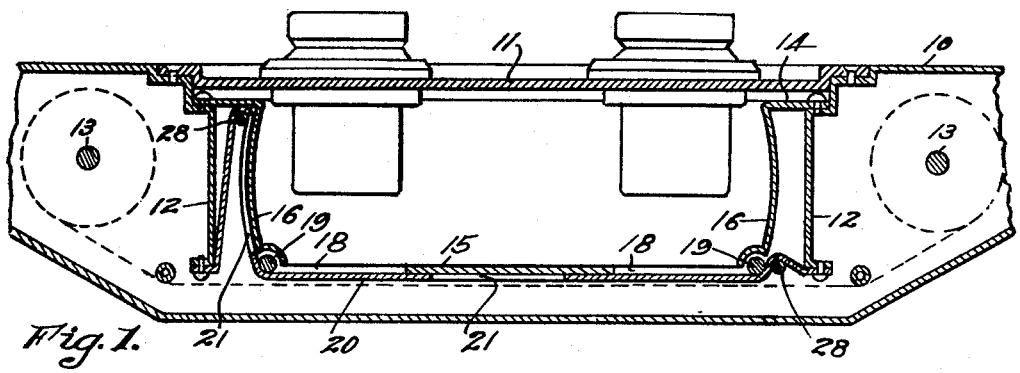
Fig. 1.
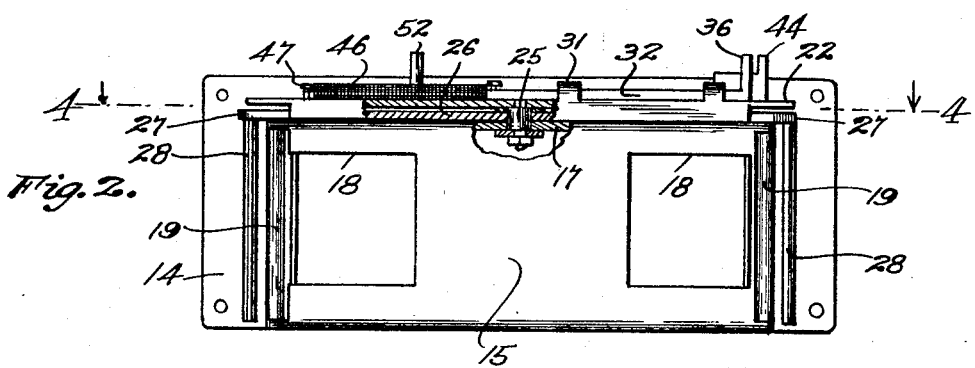
Fig. 2.
Fig. 3.
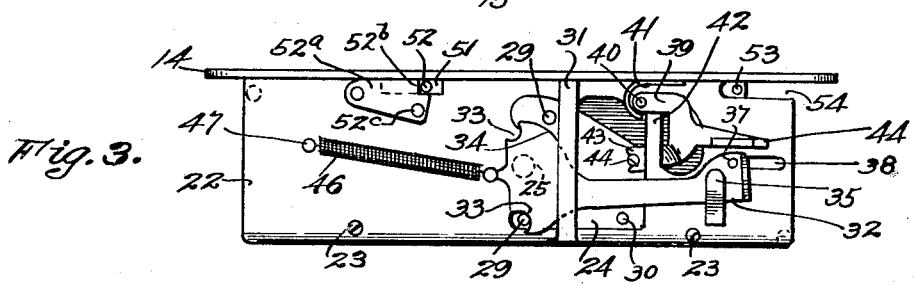
Fig. 4.
Fig. 5.
INVENTOR,
Theodor M. De La Garde;
BY F. E. Maynard,
ATTORNEY.

Patented Mar. 20, 1934

1,951,347

UNITED STATES PATENT OFFICE 1,951,347

FOCAL PLANE CAMERA SHUTTER

Theodor M. De La Garde, Los Angeles, Calif., assignor to Andre Barlatier, Los Angeles, Calif.

Substitute for application Serial No. 588,918, January 26, 1932. This application December 16, 1932, Serial No. 647,501

31 Claims. (Cl. 95—57)

My invention relates generally to cameras and more particularly to a focal plane camera shutter and the principal objects of my invention are, to generally improve upon and simplify the constructon of the existing forms of camera shutters, particularly those of the focal plane type and further, to provide a shutter and actuating means therefor that is relatively simple in construction, inexpensive of manufacture, positive in action and which involves comparatively few operating parts.

A further object of my invention is, to provide a camera shutter having a flexible member or curtain provided with an opening or openings and which curtain is caused to move past a stationary wall having an opening with which the opening in the flexible member coincides in order to make an exposure on the film that is positioned immediately to the rear of the curtain and the fixed wall that is provided within an exposure opening.

A further object of my invention is, to provide a focal plane camera shutter that may be advantageously employed on connection with both single and multiple lens cameras and which latter include stereoscopic cameras.

With the foregoing and other objects in view, my invention consists in certain novel features of construction and arrangement of parts that will hereinafter be more fully described and claimed and illustrated in the accompanying drawing in which:

Fig. 1 is a horizontal section taken lengthwise through a double lens or stereoscopic camera and showing a shutter of my improved construction associated therewith.

Fig. 2 is a rear elevational view of the shutter, with the flexible member or curtain removed therefrom.

Fig. 3 is a top plan view of the shutter and showing the curtain operating mechanism.

Fig. 4 is a horizontal section taken on the line 4—4 of Fig. 2.

Fig. 5 is an elevational view of the flexible member or curtain that forms a part of my improved shutter.

Referring by numerals to the accompanying drawing which illustrates a practical embodiment of my invention, 10 designates the housing of a camera, 11 the removable lens carrying plate that is arranged on the front wall of the camera, 12 transverse partitions that extend rearwardly from the front wall to the sides of the opening for the lens plate 11 and 13, the spindles that receive the film carrying spools.

All of the parts just described are of standard construction and form no part of my invention.

The frame of my improved shutter includes a substantially rectangular housing that is preferably formed of sheet metal and which occupies the space between the partitions 12 in the camera directly behind the lens or lenses that are carried by plate 11. This housing includes a front wall 14, the ends of which are detachably secured to the partitions 12, a rear wall 15, end wall 16 and top and bottom walls 17.

Formed in the rear wall 15, immediately to the rear of the lens barrels, are exposure openings 18 and journaled in suitable bearings at the rear corners of the housing, are vertically disposed rollers 19, which serve as rolling supports for the curtain in its movement across the rear surface of rear wall 15.

The curtain 20 that forms a part of my improved shutter, is formed of suitable non-stretching opaque flexible material, for instance, fabric that is impregnated with a suitable substance to render it impervious to the passage of light rays and the ends of this curtain are detachably secured to the rear ends of the partitions 12.

The length of the curtain is somewhat greater than the distance between the partitions 12 and thus portions of the curtain adjacent to the ends thereof may be folded double into the spaces between the partitions 12 and the end walls 16 of the housing during the operation of said curtain.

Formed in the curtain 20, are openings 21, that are adapted to coincide with the exposure openings 18 as the central portion of the curtain is moved lengthwise across the rear face of wall 15.

Arranged directly above and spaced apart from top plate 17 of the housing, is a plate 22 that is detachably secured to said plate 17, preferably by means of screws 23 and formed in this plate to the right of the center thereof, is an opening 24 for the accommodation of parts of the shutter operating mechanism hereinafter more fully described.

Journaled in the centers of plates 17 and 22 is a short vertically disposed shaft 25, to which is secured a plate 26 that occupies a position between the plates 17 and 22 and projecting in opposite directions from the ends of said plate 26 are arms 27 that terminate just beyond the ends of top plate 17.

Secured to and depending from the outer ends of the arms 27, are pins 28 that occupy positions behind the curtain 20.

Projecting upwardly from plate 26 on opposite sides of the axis 25 thereof, are pins 29, the upper portions of which project through opening 24 and projecting upwardly from the right-hand end of said plate 26, is a second pair of pins 30, the upper portions of which project through the opening 24.

Extending transversely of plate 22 and disposed just above the opening 24, is a retaining strap 31 and arranged for sliding movement between this strap and plate 22 is the inner end portion of a lever 32.

Formed in the inner end of this lever are notches 33 that are adapted to engage the respective pins 29 that project from plate 26 and the edges of lever 32 immediately to the rear of these notches 33, are curved as designated by 34 in order to engage against the pins 29 as lever 32 is drawn rearwardly or toward the right-hand during the setting of the shutter actuating mechanism.

The rear or right-hand end of lever 32 is arranged for sliding movement beneath a keeper 35 and projecting upwardly from the right-hand end of said lever is a pin or lip 36 that is manually engaged when said lever is actuated to set the shutter actuating mechanism.

The right-hand end of lever 32 is held for sliding movement in a definite path by means of a pin 37 that depends from said lever and which projects through a slot 38 that is formed in plate 22.

The inner end of lever 39 is fulcrummed at 40 to plate 22 directly in front of the opening 24 and secured to the fulcrummed end of this lever, is a spring 41, the free end of which bears against front plate 14, so as to resist the swinging movement of said lever 39 in one direction, and projecting from the inner portion of said lever and disposed beneath a keeper 42 that projects from plate 22 across the opening 24, is a finger 43, in the end of which is formed a notch 44, that is adapted to alternately engage pins 30, that project upwardly from plate 26.

The outer end of lever 39 occupies a position adjacent to the right-hand end of lever 32 and projecting upwardly from the outer end of said lever 39, is a pin 45, that is adapted to be engaged by the thumb or finger when lever 39 is upon its fulcrum.

Secured to the inner end of lever 32 at a point between the notches 33, is one end of a retractile spring 46, the opposite end of which is secured to a pin 47 that projects upwardly from the left-hand portion of plate 22.

Arranged for longitudinal sliding movement between plates 17 and 22, immediately behind plate 14, is a straight bar 48 and secured to the inner or left-hand end thereof, is a retractile spring 49, the opposite end of which is secured to a pin 50.

Projecting upwardly from the right-hand or inner end of bar 48, through a slot 51 in plate 22, is a pin 52 and the movement of this pin in said slot guides the bar 48 during its longitudinal movement.

Pivotally mounted on cover plate 22 to the left-hand of slot 51, is a detent 52ª provided with a shoulder 52ᵇ against which pin 52 normally engages for the purpose of holding bar 48 against movement toward the left-hand and projecting upwardly from the free end of this detent is a pin 52ᶜ that is adapted to be engaged by the thumb or finger for the purpose of disengaging the detent from pin 52.

Projecting upwardly from the right-hand end of bar 48, is a guide pin 53, that passes through a slot 54 in plate 22.

Projecting from the inner or left-hand portion of bar 48, is a lug 55, which when the bar 48 moves to its limit of movement toward the left-hand, is adapted to engage a lug 56 that projects from the left-hand portion of plate 26 toward front wall 14.

Projecting from the right-hand portion of bar 48, is a lug 57 which when said bar is moved to its limit of movement toward the left-hand is adapted to engage a shoulder 58 that is formed on the right-hand portion of plate 26.

Sliding bar 48, its lugs 55 and 57 and the lug 56 and shoulder 58 on plate 26 cooperate in controlling the operation of the shutter when time exposures are made with the equipped camera.

The operation of my improved shutter is as follows:

Assuming that the parts of the shutter occupy the positions as illustrated in Figs. 1 to 4 inclusive and it is desired to set the shutter for release in making an exposure, the upturned end 36 of lever 32 is engaged and said lever is pulled toward the right-hand, thereby effecting a disengagement of one of the notches 33 and its pin 29 and such movement expands and stores power in spring 46.

After this pulling movement on the lever continues the corresponding curved edge 34 on the lever will engage against the opposite one of the pins 29, until the end of the lever passes the engaged pin and this engagement of the curved edge of lever with the pin tilts the same slightly with respect to the axis of spring 46 so that as the end of the curved edge 34 passes the engaged pin 29 the lever 36 will swing laterally a short distance or toward the front plate 14, thereby effecting an engagement of the corresponding notch 33 with the pin 29 that is nearest said front plate 14.

The shutter is now set for operation and to release said shutter, pin or extension 44 on the outer end of lever 49 is engaged and moved toward front plate 14 against the resistance offered by spring 41 and this movement releases the engaged pin 30 from notch 44 in the end of finger 42.

Immediately following this release of the engaged pin 30, spring 46 will act to draw lever 32 toward the left-hand and as a result the engagement of said lever with the engaged one of the pins 29 will cause plate 26 to swing upon its axis 25, with the result that the left-hand one of the pins 28 will move from its position adjacent to front plate 14 to a position adjacent to the end of rear plate 15 and the other depending pin 28 will move from its position adjacent to the right-hand end of plate 15 to a point adjacent to the right-hand end of front plate 14.

As the depending pins 28 are thus shifted the right-hand pin will fold or draw the right-hand portion of the curtain 20 into the space between the right-hand partition 12 and right-hand end wall 16 and in so doing the intermediate portion of the curtain will be drawn toward the right-hand across the rear face of rear wall 15 so that the openings 21 in the curtain will pass the exposure openings 18 in said rear wall, thereby exposing those portions of the film that are disposed directly to the rear of the registering opening.

Immediately following the movement of the shutter release lever 39, the same is permitted to return to its normal position under the influence of spring 41 and upon such return the notch 44 in the end of finger 43 engages the pin 30 that is position nearest to rear wall 15 and the parts are now in position to be reset for the subsequent releasing operation. This resetting operation is effected by drawing lever 32 toward the right-hand so as to disengage said lever from pin 29 that is adjacent the front wall 14 and as said lever 32 swings laterally a slight distance, the notch 33 on the opposite side will effect an engagement with pin 29 that is adjacent to the rear wall 15.

Thus in the subsequent shutter setting operations, the engagement between the respective notches 33 and pins 29 is alternately shifted from one side of the axis 25 to the other.

The operations of the shutter actuating mechanism for making time exposures is as follows:

Assuming that plate 26 is in the position illustrated in Figs. 3 and 4 and either before or after lever 32 has been drawn to the right-hand to engage one of the pins 29 and store power in spring 46, pin 52c is engaged and detent 52a is swung away from front plate 14, thereby releasing pin 52 and permitting bar 48 to slide toward the left-hand under the influence of spring 49, thereby positioning lug 57 in the path of travel of shoulder 58 during the rocking movement of plate 26.

The operator now actuates lever 39 to release the engaged one of the pins 30 and plate 26 will swing on to axis 25 to an intermediate point in its travel so that arms 27 occupy a plane substantially parallel with front plate 14 and rear plate 15 and when so positioned the intermediate portion of the curtain will be moved so that the openings 21 therein are in registration with the openings 18 and during such registration the time exposure is made.

To permit the plate 26 and arms 27 to complete their movement, lever 39 is first actuated to disengage finger 43 from the engaged pin 30 and before the lever is permitted to return to its normal position pin 53 is engaged and bar 48 is drawn toward the right-hand so as to disengage lug 57 from shoulder 58 and as soon as such action takes place the power stored in spring 46 will act through lever 32 and the engaged one of the pins 29 to swing plate 26 and arms 27 to their limit of movement and thereby move curtain 20 so that the openings 21 therein will act in registration with the exposure openings 18.

If plate 26 is in the opposite position from that illustrated in Fig. 4, then the lugs 55 and 56 cooperate and perform the same functions as lug 57 and shoulder 58 in stopping the plate 26 at an intermediate point so that the openings 21 in curtain 20 will register with the exposure openings 18 in order to make a time exposure.

While the camera is being used for making snap shots or practically instantaneous exposures, bar 18 and its lugs 55 and 57 are held in an inoperative position by the engagement of shoulder 52b on detent 52a with pin 52 that projects from said bar.

Lip 36 and pins 44, 52 and 53 project upwardly through the top plate of the camera housing 10 in order that they may be conveniently engaged by the thumb or finger or suitable operating buttons, triggers or the like.

By varying the size or length of spring 46 so as to change the tension thereof, the speed of the shutter may be regulated and if desired a tension regulating device may be utilized in place of the pin 47 or other tension regulating means such as a dash pot or gears may be used for controlling the speed of the shutter.

While I have shown and described my invention as being applied to a camera having two lenses and two exposure openings, it will be understood that my invention may be applied with equal advantage to ordinary focal plane cameras having a single lens barrel and exposure opening.

Thus it will be seen that I have provided a camera shutter that is relatively simple in construction, inexpensive of manufacture and very effective in performing the functions for which it is intended.

It will be understood that minor changes in the size, form and construction of the various parts of my improved focal plane camera shutter may be made and substituted for those herein shown and described without departing from the spirit of my invention, the scope of which is set forth in the appended claims.

What is claimed is:

1. A shutter mechanism including an element having an aperture, a flexible device having end bights and an opening complementary to said aperture, and pay-out and take-up means engaging the bights for reciprocating the portion of said device having the opening to alternately cover or uncover the aperture.

2. A shutter mechanism including an element having an aperture, a device having an opening adapted to coincide with said aperture, and means for alternately forming bights in portions of said device at opposite sides of its opening to effect its register with the said aperture.

3. A shutter mechanism including an element having an aperture, a shutter consisting of a strip of flexible material having an opening complementary to the said aperture and having fixed portions beyond the sides of the opening, and means for alternately forming bights in the element at each side of the opening; whereby to cover or uncover the aperture.

4. A shutter mechanism including an element having an aperture, and a shutter therefor provided with a device having a portion with an opening and having flexible portions at opposite sides of the opening, and means for forming bights in said flexible portions; whereby to cover or uncover the aperture.

5. A shutter member having an opening adapted to be registered with an aperture in another element and having, at opposite sides of the opening, flexible take-up and pay-out bight portions to effect covering or uncovering of the said aperture.

6. A shutter member having an opening adapted to be registered with an aperture in a complementary element and having, at opposite sides of the opening, flexible take-up and pay-out bight portions, and means for concurrently paying out one bight and taking up the other and vice versa; whereby to cover or uncover the aperture.

7. An aperture shutter including a member having an opening registerable with a complementary aperture and provided with flexible bight portions each adapted for pay-out and take-up action, and means for alternately paying out and taking up said portions.

8. An aperture shutter including a member having an opening registerable with a complementary aperture and provided with flexible bight portions each adapted for pay-out and take-up action, and means for alternately paying out and taking up said portions and reciprocating said member to cover or uncover said aperture.

9. An aperture plane shutter consisting of a member adapted to lie contiguous to an apertured element and having flexible portions, and pay-out and take-up means forming bights in said portions and for reciprocating the shutter member to cover or uncover the aperture.

10. An aperture plane shutter consisting of spaced flexible pay-out and take-up bight parts connected by a portion, having an opening complementary to an aperture in an associated element, which is reciprocated by action of the said parts.

11. An aperture plane shutter consisting of a piece of flexible material having an opening complementary to the aperture to be covered or uncovered and whose end parts constitute bights which are each adapted for take-up or pay-out to shift the opening, and means for controlling such actions.

12. An aperture element, an apertured strip of flexible material lying along and close to the element, and means making bights in said strip and for alternately taking up or paying out each bight portion of the strip whereby to effect covering or uncovering of the plate aperture.

13. An aperture element, an apertured strip of flexible material lying along and close to the element and having bights, and means for concurrently paying out one bight portion of the strip and taking up the other and vice versa.

14. An aperture element, an apertured shutter strip of flexible material having bights at opposite sides of the aperture, and means engaging the bights and placing the strip under tension to hold it smooth along the element.

15. An aperture element, an apertured shutter strip having bights of flexible material, and means engaging the bights and placing the strip under tension to hold it smooth along the element and to shift the strip to cover or uncover the plate aperture.

16. An aperture element, a shutter including an apertured part and variable flexible bight portions on each side thereof, and means placing the said portions under tension to hold the said part close to the element.

17. An aperture element, a shutter including an apertured part and flexible portions on each side thereof, and means placing the said portions under tension to hold the said part close to the element and forming variable bights therein, and operative to pay out and take up said portions and thereby shift the said part.

18. A shutter mechanism including an apertured element, a shutter including an apertured part and flexible bight portions at the sides of said part, spaced guides beyond the sides of the aperture of said element, and means for drawing said portions back and forth on said guides to shift said apertured part to cover or uncover the element aperture.

19. In a shutter mechanism; a shutter having flexible bight parts, a movable member having on diametrically opposite portions means operatively engaging in the bights, means to latch said member in its several positions, a setting element operatively connecting with said member in different positions thereof, and means acting on said element for actuating said member when the said latch means is tripped to effect change in the lengths of the bights and to secure shutter shift.

20. The combination with a camera having an exposure opening, of a flexible member arranged so that its intermediate portion moves across said exposure opening, said intermediate portion of the member having an opening that is adapted to coincide with said exposure opening and means for alternately engaging and moving the end portions of said member so as to impart corresponding movement to the intermediate portion of said member.

21. The combination with a camera having an exposure opening, of a flexible member arranged so that its intermediate portion moves across said exposure opening, said intermediate portion of the member having an opening that is adapted to coincide with said exposure opening and means for alternately engaging the end portions of said member so as to move the intermediate portion thereof across said exposure opening.

22. The combination with a camera having an exposure opening, of a flexible member having its ends secured on opposite sides of said exposure opening, there being an opening formed in the intermediate portion of said member adapted to coincide with said exposure opening and means for alternately engaging portions of said member and moving the intermediate portion thereof across the exposure opening.

23. A camera having an exposure opening, a flexible member having its ends secured on opposite sides of said opening and having an aperture registerable with said opening and means for alternately folding the end portions of said member to cause the intermediate part thereof to move across said opening.

24. In a camera, a support having an exposure aperture on the lens axis, a flexible member arranged on the support and having an opening registerable with said aperture, and an oscillating member for alternately engaging and moving portions of said member to shift an intermediate portion thereof across the said aperture.

25. In a camera, a supporting structure having an exposure aperture, a flexible member having an opening registerable with said aperture, an element mounted for swinging movement on said structure and engaging end portions of said member to cause an intermediate portion thereof to move across said aperture to register the opening therewith, and manually operable means for causing said element to swing from one position to another.

26. In a camera, a part having an exposure aperture, a flexible member having an opening registerable with said aperture, and manually controlled, spring actuated means including an oscillating element engaging said member to effect reciprocation of its opening across the aperture.

27. In a camera, a housing provided with an exposure aperture, a flexible member having ends secured to fixed supports and having an intermediate portion with an opening registerable with said aperture, an oscillative member provided with means for engaging portions of the flexible member, and manually controlled, spring actuated means for motivating the oscillating member.

28. A camera action of the type set forth in claim 27, and having manually operative means for stopping the oscillating member at an intermediate point in its complete stroke.

29. In a camera, a housing provided with an exposure aperture, a curtain having bights in its end portions and having an opening registerable with said aperture, an oscillating member having means engaging in said bights, pins on, and at opposite sides of the axis of, said member, a manually controlled, spring actuated element for alternately engaging said pins, and trip means for normally holding said member against movement.

30. In a camera, a housing provided with an exposure aperture, a curtain having bights and an intermediate portion with an opening registerable with the aperture, an oscillating member provided with diametrically opposite pins and having means engaging said bights, a motivating device alternately engaging said pins, trip means for normally holding said member against action by said device, and manually controlled means for determining stroke of said member.

31. In a focal-plane-shutter camera, a member having an exposure aperture, a curtain having an opening registerable with said aperture and having end bights, and manually controlled means operatively engaging said bights; whereby to alternately shift the opening of the curtain back and forth across the aperture for picture exposure on movement of the open part of the curtain in each direction.

THEODOR M. DE LA GARDE.